Figure 1:
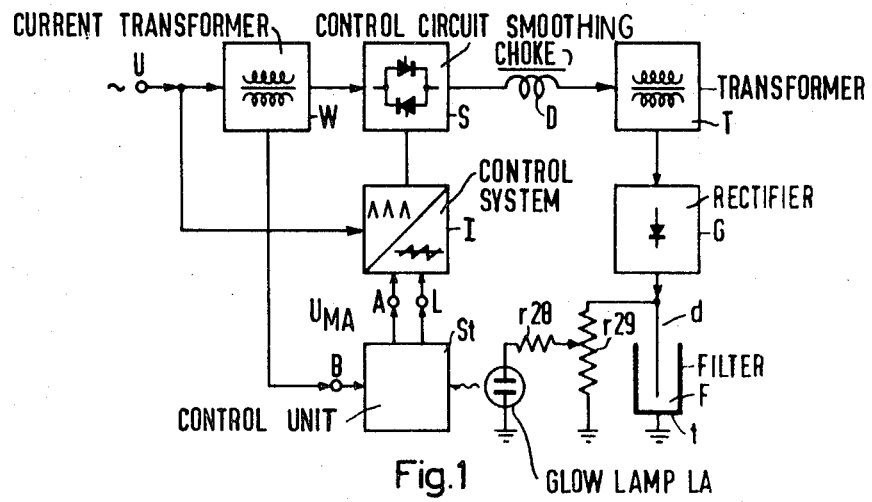

United States Patent

[11] 3,602,805

[72] Inventor Lovro Vukasovic
    Munich, Germany
[21] Appl. No. 17,107
[22] Filed Mar. 6, 1970
[45] Patented Aug. 31, 1971
[73] Assignee Siemens Aktiengesellschaft
    Berlin, Germany
[32] Priority Mar. 8, 1969
[33] Germany
[31] P 19 11 923.4

[54] CIRCUIT ARRANGEMENT FOR AUTOMATIC CONTROL OF THE VOLTAGE OF AN ELECTRICAL FILTER
3 Claims, 2 Drawing Figs.

[52] U.S. Cl. .................................................. 323/22 SC,
    55/105, 307/246, 323/66
[51] Int. Cl. .................................................. G05f 1/44
[50] Field of Search .................................. 320/1, 21;
    323/22 T, 24, 38, 39, 66; 307/246, 297; 55/105

[56] References Cited
UNITED STATES PATENTS
3,147,094  9/1964  Hall et al. ...................... 55/105
3,507,096  4/1970  Hall et al. ...................... 323/22 (SC) X
3,527,022  9/1970  Archer et al. ................... 323/66 X
3,529,404  9/1970  Quisser ........................... 55/105

*Primary Examiner*—Gerald Goldberg
*Attorneys*—Curt M. Avery, Arthur E. Wilfond, Herbert L. Lerner and Daniel J. Tick ABSTRACT: A current transformer is connected between a source of voltage and a control circuit and supplies a signal when the current flowing through the filter exceeds a predetermined critical value. A control unit, which is coupled to the control circuit via a control system and which is connected to the current transformer, includes an auxiliary circuit connected in parallel with a charging circuit of a guide capacitor. The auxiliary circuit comprises a switching component having characteristics and a control circuit which are such that the guide capacitor charges more rapidly when the switching component is in its nonconductive condition than via the charging circuit. The switching condition of the switching component depends upon the switching position of a reversing switch and the signal from the current transformer. The switching component is in its nonconductive condition only during the time between the energization of the circuit arrangement via the reversing switch and the time during which the current transformer provides a signal for the first time after the energization of the circuit arrangement.

3,602,805

CIRCUIT ARRANGEMENT FOR AUTOMATIC CONTROL OF THE VOLTAGE OF AN ELECTRICAL FILTER

DESCRIPTION OF THE INVENTION

The invention relates to the control of the voltage of an electrical filter, such as an electrical precipitator. More particularly, the invention relates to a circuit arrangement for the automatic control of the voltage of an electrical filter.

A control circuit controls the filter voltage. A control system supplies a control magnitude to the control circuit, which magnitude varies in accordance with a control voltage supplied to a control unit, which control unit is in turn connected to the control system. The control unit includes a guide capacitor connected to a source of DC voltage via a charging circuit. The control voltage depends upon the voltage of the guide capacitor. A discharge circuit is connected in parallel with the guide capacitor and contains a controllable resistor having a resistance value which depends upon the filter voltage.

The term "guide capacitor" is indicative of the purpose fulfilled by a capacitor in a control circuit for an electrical filter; that is, to guide the filter voltage in such a way that after each sparkover of the filter the best possible linear rise of the voltage is provided.

In installations or circuit arrangements of the aforedescribed type, the filter voltage is decreased by a specific amount during each sparkover, or upon reaching a maximum permissible current. The filter voltage continues to increase from its reduced magnitude until a new sparkover occurs in the filter, or until the maximum permissible current is again reached.

The filter voltage depends upon the voltage of the guide capacitor, which capacitor is connected via a relatively high ohmic resistor to the source of DC voltage. This voltage is usually very high in order to permit a gradual, as well as the best possible, linear increase of the voltage. As a result, the time lapse between the energization or switching on of the circuit arrangement or installation and the attainment of the optimum operating condition for the filter, or first sparkover, becomes undesirably long.

The principal object of the invention is to provide a new and improved circuit arrangement for the automatic control of the voltage of an electrical filter.

An object of the invention is to provide a circuit arrangement for the automatic control of the voltage of an electrical filter which overcomes the disadvantages of known similar types of circuit arrangement.

An object of the invention is to provide a circuit arrangement for the automatic control of the voltage of an electrical filter, which circuit arrangement functions to shorten the aforedescribed time lapse between the energization of the circuit arrangement and the attainment of the optimum operating condition for the filter.

An object of the invention is to provide a circuit arrangement for the automatic control of the voltage of an electrical filter, which circuit arrangement functions with efficiency, effectiveness and reliability.

In accordance with the invention, a circuit arrangement for automatic control of the voltage of an electrical filter comprises a control circuit coupled to an electrical filter for changing the voltage of the filter. A source of voltage is coupled to the control circuit. A current transformer is connected between the source of voltage and the control circuit and has an output and supplies a signal when the current flowing through the filter exceeds a predetermined critical value. A control system has an input coupled to the source of voltage, input means and an output connected to the control circuit for supplying to the control circuit a control magnitude. The control magnitude depends upon a control voltage supplied to the input means of the control system. A control unit has an input coupled to the source of voltage and connected to the output of the current transformer and output means coupled to the input means of the control system. The control unit comprises a source of DC voltage. A charging circuit connects a guide capacitor to the source of DC voltage whereby the control voltage supplied to the control is produced by the control unit in accordance with the voltage of the guide capacitor. A discharging circuit is connected in parallel with the guide capacitor. The current in said discharging circuit is controllable in accordance with the voltage of the filter and the current of the filter. Auxiliary circuit means connected in parallel with the charging circuit comprises a switching component having characteristics and a control circuit which are such that the guide capacitor charges more rapidly when the switching component is in its nonconductive condition than via the charging circuit. The switching condition of the switching component depends upon the switching position of a reversing switch and the signal from the current transformer. The switching component is in its nonconductive condition only during the time which elapses between the energization of the circuit arrangement via the reversing switch and the time during which the current transformer provides a signal for the first time after the energization of the circuit arrangement. The control unit further comprises a thyristor connected in parallel with the control circuit of the switching component. Circuit means including the switching path of the reversing switch is connected in parallel with the thyristor. The switching path is blocked when the circuit arrangement is deenergized. The thyristor has a control path coupled to the current transformer in a manner whereby the thyristor is switched to its conductive condition at the first signal of the current transformer after the energization of the circuit arrangement. The charging circuit of the control unit includes a transistor and circuit means connecting the transistor as a constant current regulator.

Figure 2:
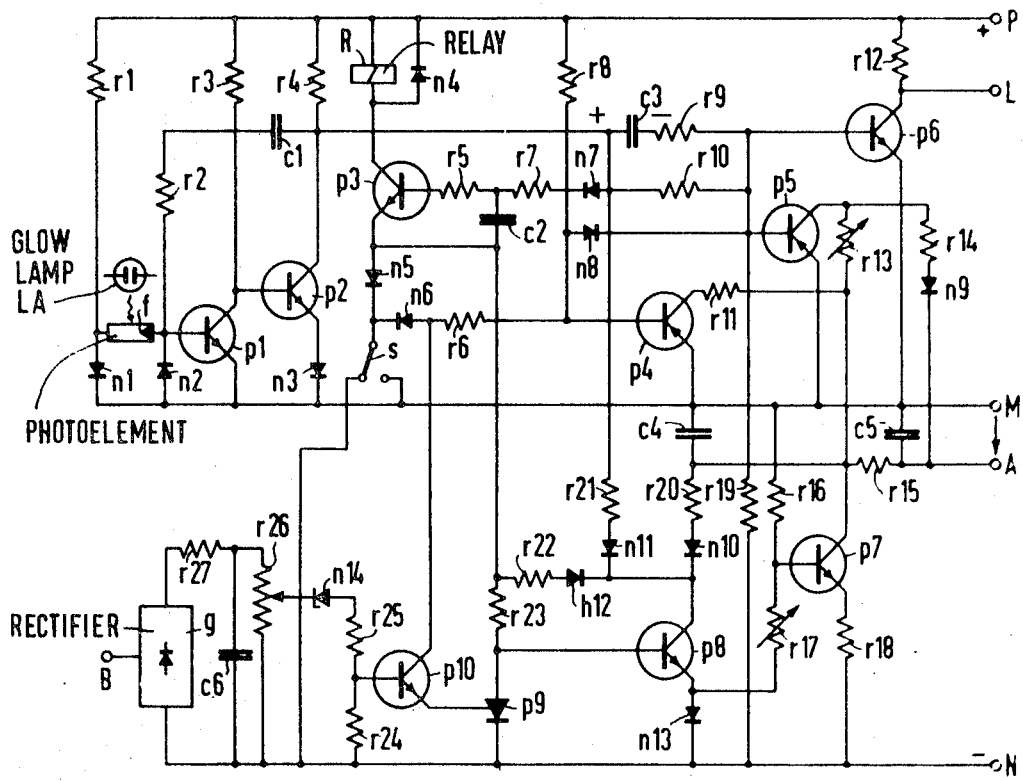

In order that the invention may be readily carried into effect, it will now be described with reference to the accompanying drawing, wherein:

FIG. 1 is a block diagram of an embodiment of the circuit arrangement of the invention; and FIG. 2 is a circuit diagram of the control unit $St$ of FIG. 1.

In FIG. 1, an electrical filter F is coupled to the secondary winding of a high voltage transformer T via a rectifier G. The electrical filter, also called electrical precipitator, is shown diagrammatically as a high voltage wire $d$ and a grounded metallic tube $t$. The primary winding of the transformer T is coupled to an input terminal U of a single or multiphase AC voltage power system via a smoothing choke D, a control circuit S and a current transformer W. The current transformer W, the control circuit S and the smoothing choke D are connected in series circuit arrangement between the input terminal U and the transformer T. The smoothing choke D functions to improve the shape of the signals supplied to the transformer T. The control circuit S comprises thyristors connected in antiparallel arrangement, that is, with the anode of one connected to the cathode of the other and the cathode of the first connected to the anode of the second.

Control pulses for the thyristors of the control circuit S are supplied by a control system I. In order to synchronize the control system I, the alternating voltage of the AC voltage power supply, applied via the input terminal U, is applied to said control system. A control voltage $U_{MA}$ is applied to the control system I via an input terminal A. The control voltage $U_{MA}$ determines the phase position of the control pulses relative to the alternating voltage of the AC voltage power supply. Control system I can consist of a known standard unit, for instance control unit teb–p4 se401, manufactured by Siemens AG, Germany.

The provision of control pulses by the control system I may be blocked without delay, and without regard to the magnitude of the control voltage $U_{MA}$, by a cutoff signal supplied to said control system via an input terminal L thereof. The control voltage $U_{MA}$ and the cutoff signal are supplied by a control unit $St$. The cutoff signal is supplied to the control system I by the control unit $St$ when a short circuit or similar fault occurs in the filter F.

At the onset of operations, a specific instance may occur. The control voltage $U_{MA}$ is applied to the control system I by the control unit $St$ and depends upon a signal supplied to said control unit by the current transformer W. The signal supplied by the current transformer W to the control unit $St$ is proportional to the filter current and indicates a short circuit, breakdown, light arc, or the like, in the filter F. The signal is obtained via a photosensitive semiconductor device included in the control unit $St$ and exposed to light produced by a glow lamp $La$. The glow lamp $La$ is connected in parallel with the filter F via a pair of resistor $r28$ and $r29$ so that said glow lamp glows only when said filter is in operation. When a sparkover occurs in the filter F, the glow lamp $La$ is extinguished.

FIG. 2 illustrates the circuit arrangement of the control unit $St$. The control unit includes a rectifier $g$, which is preferably a full wave rectifier, and has applied to it via an input terminal B a voltage proportional to the filter current. The rectifier $g$ is connected via a resistor $r27$ to an RC member $c6$, $r26$. The resistor $r26$ of the RC member has a variable resistance. The variable resistance of the resistor $r26$ is coupled in parallel with a voltage divider $r24$, $r25$ via a Zener diode $n14$. The resistor $r24$ of the voltage divider $r24$, $r25$ is connected in parallel with a series circuit arrangement of the control path of a transistor $p10$ and a thyristor $p9$. The collector electrode of the transistor $p10$ is coupled to a positive polarity terminal P of a DC voltage source via a resistor $r6$ and a resistor $r8$. The emitter electrode of the transistor $p10$ is connected to the control electrode of the thyristor $p9$. The base electrode of the transistor $p10$ is connected to a common point in the connection between the resistors $r24$ and $r25$ of the voltage divider $r24$, $r25$.

The direct voltage source has, in addition to the positive polarity terminal P, a negative polarity terminal N and an intermediate terminal or tap M, and delivers a voltage of 24 Volts between said positive polarity terminal and said intermediate terminal and between said intermediate terminal and said negative polarity terminal. A series circuit arrangement of a first guide capacitor $c4$, a resistor $r20$, a diode $n10$, the emitter-collector path of a transistor $p8$ and a diode $n13$ is connected between the intermediate terminal M and the negative polarity terminal N. The base electrode of the transistor $p8$ is connected to the anode of the thyristor $p9$. The cathode of the thyristor $p9$ is connected to the negative polarity terminal N.

The emitter-collector path of a transistor $p7$ is connected in parallel with a resistor $r20$, a diode $n10$, the transistor $p8$ and the diode $n13$, all of which components are connected in series circuit arrangement. The emitter-collector path of the transistor $p7$ is connected in series circuit arrangement with a resistor $r18$. The base electrode of the transistor $p7$ is connected to a voltage divider $r16$, $r17$ which is connected between the intermediate terminal M and the emitter electrode of the transistor $p8$. The transistor $p7$ maintains constant a charging current flowing therethrough. The transistor $p7$ maintains the charging current constant at a value which may be readily adjusted, within a large range, by the variable resistor $r17$ of the voltage divider $r16$, $r17$, or by the resistor $r18$.

The first guide capacitor $c4$ is connected in parallel with a second guide capacitor $c5$ via a resistor $r15$. The control voltage $U_{MA}$ is derived from the second guide capacitor $c5$ for the control system I. The capacitance of the second guide capacitor $c5$, however, is only a fraction of capacitance of the first guide capacitor $c4$.

In order to discharge the first guide capacitor $c4$, in accordance with the filter current, said capacitor is connected in parallel with the emitter-collector path of a transistor $p4$ via a resistor $r11$. The base electrode of the transistor $p4$ is connected to the positive polarity terminal P via a resistor $r8$.

To discharge the guide capacitors during a sparkover in the filter F, the emitter-collector path of a transistor $p5$ is connected in parallel with the first guide capacitor $c4$ via a variable resistor $r13$ and is connected in parallel with the second guide capacitor $c5$ via a resister $r14$ and a diode $n9$. The time constant provided by the second guide capacitor $c5$ and the resistor $r14$ is selected to small that said capacitor is discharged when the transistor $p5$ is in fully conductive condition whereby the discharge is substantially complete due to a sparkover in the filter F. On the other hand, the charging time constant determined by the second guide capacitor $c5$ and the resistor $r15$ is also so small that the voltage at said capacitor increases extremely rapidly to the voltage of the first guide capacitor $c4$ after the elimination of a sparkover in the filter F and the switching of the transistor $p5$ to its nonconductive condition.

The discharge of the first guide capacitor $c4$ during a sparkover of the filter F and during fully conductive condition of the transistor $p5$, is much slower and is determined by the resistance value of the variable resistor $r13$. Thus, after a sparkover in the filter F, the voltage at the first guide capacitor, $c4$ is lower than that prior to the sparkover by only a small percentage adjustable by the variable resistor $r13$.

A sparkover of the filter F is measured by the glow lamp $La$. The glow lamp $La$ is positioned above a photoelement $f$ in a manner whereby the photosensitive region of said photoelement is exposed to light produced by said glow lamp. The photoelement $f$ is connected in parallel with the base-emitter path of a transistor $p1$ via diode $n1$. The transistor $p1$ and diode $n1$ are so connected that during the irradiation of the photoelement $f$, the voltage at said photoelement controls said transistor to its fully conductive condition.

The transistor $p1$ and a transistor $p2$ function as a monostable flip flop with resistors $r2$, $r3$ and $r4$ and a capacitor $c1$. When the glow lamp $La$ glows or produces light, that is, during normal operation of the filter, the transistor $p1$ is in its fully conductive condition and the transistor $p2$ is in its nonconductive condition. When there is a sparkover in the filter F, and during the occurrence of such sparkover, the glow lamp $La$ is extinguished or quenched and the transistor $p1$ is switched to its nonconductive condition. The transistor $p2$ is then switched to its fully conductive condition. The capacitor $c1$, which was charged via the resistors $r4$ and $r2$ and the transistor $p1$, discharges via the transistor $p2$, a diode $n3$, and the diode $n2$ and the resistor $r2$ thereby maintaining, regardless of the operational condition of the filter F, the transistor $p1$ in its nonconductive condition. The full control of the transistor $p2$ is thereby maintained, regardless of the operational condition of the filter F, for a specific period determined by the time constant of the discharge circuit.

The base electrode of the transistor $p5$ is connected to the collector electrode of the transistor $p2$ via a resistor $r9$ and a capacitor $c3$ connected in series circuit arrangement with each other. The base electrode of the transistor $p5$ is connected to the negative polarity terminal N via a resistor $r19$. A resistor $r10$ is connected in parallel with the series circuit arrangement of the resistor $r9$ and the capacitor $c3$. When the transistor $p2$ is in its nonconductive condition, during normal operation of the filer F, the capacitor $c3$ is charged to a voltage having the indicated polarity. When the transistor $p2$ is in its fully conductive condition, the capacitor $c3$ may discharge via the transistor $p2$, a diode $n3$, the emitter-base path of the transistor $p5$ and the resistor $r9$. The transistor $p5$ is thus always in its fully conductive condition simultaneously with the transistor $p2$. The discharged circuit of the capacitor $c3$ is preferably so rated that the fully conductive condition of the transistor $p5$ is not terminated prior to the termination of the flip-flop reset time of the monostable flip-flop circuit.

Each of the transistors $p1$, $p2$, $p3$, $p7$, $p8$ and $p10$ is an NPN-type transistor. Each of the transistors $p4$ and $p5$ is a PNP-type transistor. A transistor $p6$ is an NPN-type transistor. The control path of the transistor $p5$ is connected in parallel with the control path of the transistor $p6$. The emitter-collector path of the transistor $p6$ is connected between the positive polarity terminal P and the intermediate terminal M via a resistor $r12$. The output terminal L of the control unit $St$, connected to the control system I, is connected to the collector electrode of the transistor $p6$.

A voltage divider $r4$, $r10$, $r19$ is so rated that the voltage applied to the control path of the transistor $p6$ when the transistor p2 is in its nonconductive condition, is sufficient to switch the transistor p6 to its fully conductive condition. The transistor p5 is then in its nonconductive condition. The base electrode of the transistor p6 is coupled to the positive polarity terminal P via a diode n8 and the resistor r8. The resistance values of resistor r8 and r6 are so rated that the potential at the junction point of said resistors is such that the diode n8 is in its nonconductive condition. This occurs during the illustrated position of a reversing switch s shown in FIG. 2, or when the transistor p10 is in its fully conductive condition. The diode n8 is in its conductive condition when the reversing switch s is in its position not shown in FIG. 2 and the transistor p10 is in its nonconductive condition.

In order to determine a metallic short circuit in the filter F, the control unit S t includes a relay R having a working contract. The relay R is coupled between the positive and negative polarity terminals P and N via the emitter-collector path of a transistor p3, a diode n5 and the reversing switch s. The base electrode of the transistor p3 is connected to the collector electrode of the transistor p2 via resistors r5 and r7 and a diode n7. The transistor p3 is thus switched to its fully conductive condition when the transistor p2 is switched to its conductive condition, during normal operation of the filter F.

A capacitor c2 is connected between a common point in the connection between the resistors r5 and r7 and the emitter electrode of the transistor p3. The capacitor c3 has a relatively high capacitance of a magnitude which determines, together with the resistance value of resistor r5, the time which elapses between a short circuit in the filter F, the transistor p2 being in its fully conductive condition, and the deenergization of the relay R.

The collector electrode of the transistor p8 is connected to the collector electrode of the transistor p2 via a diode n11 and a resistor r21 connected in series circuit arrangement. The collector electrode of the transistor p8 is also connected to the emitter electrode of the transistor p3 via a diode n12 and a resistor r22. The emitter electrode of the transistor p3 is connected to the base electrode of the transistor p8 via a resistor r23. The resistor r21 is rated at approximately the same resistance value as the resistor r4, so that when the transistor p2 is in its nonconductive condition, and the transistor p8 is in its fully conductive condition, the approximate potential of the intermediate terminal is applied to the collector electrode of the transistor p2. This prevents the capacitor c3 from being charged while the increasing of the voltage at the filter F, following the switching of said transistor to its conductive condition. The periodic extinguishing of the glow lamp La, when the transistor p2 is in its fully conductive condition, due to the ripple or pulsation factor of the filter voltage during the increase thereof, may therefore not result in a voltage drop during such period. A control current is therefore supplied to the transistor p6 via the resistor r8 and the diode n8, if the reversing switch s is in its condition opposite that shown in FIG. 2 and the transistor p10 is in its nonconductive condition.

The resistance values of the relay R and of the resistor r22 are so rated that the emitter electrode of the transistor p3 is sufficiently negative during such condition of operation that the diode n5 is switched to its nonconductive condition and the transistor p3 remains in its fully conductive condition. The reversing switch s functions to maintain a predetermined initial condition during the commencement of the installation. In the position of the reversing switch s shown in FIG. 2, the base electrode of the transistor p8 is connected to the negative polarity terminal N via resistor r23 and the diode n5, so that said transistor is switched to its nonconductive condition. On the other hand, the transistor p4, which is connected in parallel with the first guide capacitor c4, is in its fully conductive condition, since the base electrode of said transistor is connected to the negative polarity terminal N via the resistor r6 and the diode n6. Since no voltage is applied to the filter F, the transistors p2 and p5 are in their fully conductive conditions. The transistor p6 is its conductive condition and a cutoff signal is supplied to the terminal L of the control unit S t. The first and second guide capacitors c4 and c5 are discharged.

When the reversing switch s is in its position shown in FIG. 2, the thyristor p9 is quenched, extinguished or switched to its nonconductive condition, after the installation is switched off.

To initiate the installation the reversing switch s is moved into its second position, opposite to that shown in FIG. 2, in which the cathodes of the diodes n5 and n6 are connected to the intermediate terminal M. The junction point of the resistors r6 and r8 thus becomes so positive that the transistor p4 is switched to its nonconductive condition and the transistor p6 is switched to its conductive condition. This eliminates the cutoff signal supplied to the terminal L of the control unit S t, so that the control system I (FIG. 1) supplies control pulses to the control circuit S (FIG. 1). The phase position of the control pulses supplied to the control circuit S by the control system I depends upon the control voltage $U_{MA}$ at the second guide capacitor c5.

The transistor p8 is supplied with a control current which switches it to its fully conductive condition, via the transistor p3 and the resistor r23. The first and second guide capacitors c4 and c5 are therefore charged to a voltage of the polarity indicated in FIG. 2, via the resistor r20, the diode n20, the transistor p8 and the diode n13. The charging time constant has a very low value, since the filter voltage, which depends upon the voltage at the second guide capacitor c5, is to obtain the breakthrough value as soon as possible, following the switching on of the installation.

As soon as the transistor p8 is in its conductive condition, after reversal of the reversing switch s, a current also flows via the resistor r4 and r21 and the diodes n11 and n13. At the aforedescribed rating of the resistors, this means that the potential at the collector electrode of the transistor p2 corresponds approximately to the potential of the intermediate terminal M, regardless of the operating condition of the filter F and the condition of the monostable flip-flop or multivibrator circuit. Despite this, the transistor p3 is supplied with a control current via the diode n7, the resistor r7, the resistor r5, the resistor r22, the diode n12, the emitter-collector path of the transistor p8 and the diode n13, since the emitter potential of the transistor p3 is more negative at the aforedescribed rating of the relay R and the resistor r22 than the potential of the intermediate terminal M. The relay therefore remains in its energized condition.

During the rapid charging of the first and second guide capacitors c4 and c5 via the transistor p8 in its conductive condition, the transistor p6 is supplied a full control current, via the resistor r8 and the diode n8. Thus, no cutoff signal is supplied to the terminal L of the control unit St. The control system I (FIG. 1) therefore delivers control pulses to the control S. The phase position of the control circuit therefore depends upon the control voltage $U_{Ma}$ at the second guide capacitor c5.

The increase of the voltage at the second guide capacitor c5 and the corresponding increase of the filter voltage causes the filter current to increase also. The voltage derived at the resistor r26 thus also increases. At a specific value of the voltage at the resistor r26, which is the reference value of the filter current, the Zener diode n14 is switched to its conductive condition and conducts current and the transistor p10 and the thyristor p9 are switched to their fully conductive condition. Thence the current through the relay R flows through the thyristor p9, via the transistor p3 and the resistor r23. The transistor p8 is switched its nonconductive condition, since the control path of said transistor is short circuited by the transistor p9. This terminates the exponential rapid charging of the first and second guide capacitors via the transistor p8 and the output signal provided by the monostable multivibrator via the resistor r21 and the diode n11.

The thyristor p9 remains in its conductive condition until the reversing switch s is reversed in position or the installation is switched off. Regardless of the conductive condition of the transistor p10, the thyristor p9 remains in its fully conductive condition. The first and second guide capacitors c4 and c5 may therefore be changed with a constant current during operation, only via the transistor p7 and the resister r18. The charge of the guide capacitors $c4$ and $c5$ is substantially independent of the ambient temperature, due to the diode $n13$ coupled to the base electrode or control circuit of the transistor $p7$. This is of considerable importance when the time constant is very large. The control circuit of the transistor $p7$ is of relatively low resistance, so that it is easily possible to position the variable resistor $r17$ far away from the remainder of the installation, on a control board.

If the filter current exceeds the reference value during operation, the transistor $p10$ and the transistor $p4$ are temporarily in their fully conductive condition, so that the first and second guide capacitors $c4$ and $c5$ are slightly discharged. The filter voltage therefore decreases. The filter current again decreases to a value less than the reference value and the transistors $p10$ and $p4$ are switched to their nonconductive condition. The voltage of the first and second guide capacitors $c4$ and $c5$ and of the filter F thereafter slowly commences to increase linearly. The filter current is limited in this manner to the reference value, without a voltage-dependent decrease, during the time that no sparkover occurs in the filter F.

During a sparkover in the filter F, the transistor $p5$ is switched to its fully conductive condition by the discharge of the capacitor $c3$, regardless of the magnitude of the filter current. The first guide capacitor $c4$ is thereby discharged, via the resistor $r13$, by a specific relatively small, amount. The second capacitor $c5$ discharges almost completely, via the resistor $r14$ and the diode $n9$. Furthermore, when the transistor $p5$ is in its fully conductive condition, the transistor $p6$ is switched to its nonconductive condition, so that a control pulse is not supplied to the control circuit S (FIG. 1) due to the supply of a cutoff signal to the terminal L of the control unit $St$.

Upon the termination of the reset time of the monostable flip-flop circuit, the transistor $p5$, is switched to its nonconductive condition and the second guide capacitor $c5$ is charged relatively rapidly to the voltage of the first guide capacitor $c4$. The filter voltage increases correspondingly rapidly, since the transistor $p5$ is in its conductive condition. Therefore, there is no longer a cutoff signal at the terminal L. The rate of charging of the second guide capacitor $c5$ is adjusted to the installation in a manner whereby the filter voltage increases as rapidly as possible without varying abruptly the value determined by the first guide capacitor $c4$.

During the exponential charging of the first and second guide capacitors $c4$ and $c5$, with the transistor $p8$ in its fully conductive condition, the transistor $p5$ may not be supplied with a control current via the resistor $r18$. This is due to the fact that the transistor $p6$ is supplied with a control current for switching it to its fully conductive condition, via the resistor $r8$ and the diode $n8$, so that the voltage applied to the base-emitter path of the transistor $p6$ is applied as a blocking bias voltage to the control path of the transistor $p5$. The control current for the transistor $p6$, via the resistor $r8$ and the diode $n8$, is omitted, however, if the filter current reaches the value of the reference current at the end of the voltage increasing period and the transistor $p10$ is thereby fully controlled or switched to its fully conductive condition. If there is no sparkover in the filter F at such time, and the transistor $p2$ flip-flop circuit is therefore in its nonconductive condition, the transistor $p6$ is supplied with a full control current via the resistors $r4$ and $r10$ and is switched thereby to its fully conductive condition.

If, however, during the initial response of the transistor $p10$ after the initiation of the installation a sparkover or a light arc occurs in filter F, as a result of which the transistor $p2$ is switched to its fully conductive condition, the transistor $p6$ is not supplied with control current, either via the resistors $r4$ and $r10$ or the resistor $r8$ and the diode $n8$, so that the transistor $p6$ is switched to its nonconductive condition and a cutoff signal is provided at the output terminal L for obstructing the control pulse provided for the control circuit F.

Simultaneously, the transistor $p5$ is supplied with a full control current via the resistor $r19$ to switch said transistor to its fully conductive condition. This assures the discharge of the second guide capacitor $c5$. A full control of the transistor $p5$ by the capacitor $c3$, via the transistor $p2$, would not be possible, however, at the termination of the exponential charging of the guide capacitors, since the capacitor $c3$ could not yet be charged due to the transistor $p8$ being in its fully conductive condition. Thus, although in the period following the exponential charging of the guide capacitors, a cutoff signal is provided at the output terminal L and the discharge of both said guide capacitors is effected by the transistor $p5$ during each sparkover of the filter F, regardless of the filter current, a voltage drop in said transistor and the provision of a cutoff signal are initiated after the exponential charging, if a sparkover or a light arc is present in the filter and if the filter current has reached or exceeded the reference value.

The invention may also be utilized in installations for the control of an electronic beam or an ion beam, for material processing.

While the invention has been described by means of a specific example and in a specific embodiment, we do not wish to be limited thereto, for obvious modifications will occur to those skilled in the art without departing from the spirit and scope of the invention.

I claim:

1. A circuit arrangement for automatic control of the voltage of an electrical filter, said circuit arrangement comprising a control circuit coupled to an electrical filter for changing the voltage of said filter;
   a source of voltage coupled to said control circuit;
   a current transformer connected between said source of voltage and said control circuit and having an output for supplying a signal when the current flowing through said filter exceeds a predetermined critical value;
   a control system having an input coupled to said source of voltage, input means and an output connected to said control circuit for supplying to said control circuit a control magnitude, said control magnitude depending upon a control voltage supplied to the input means of said control system;
   a control unit having an input couple to said source of voltage and connected to the output of said current transformer and output means coupled to the input means of said control system, said control unit comprising a source of DC voltage, a guide capacitor, a charging circuit connecting said guide voltage supplied to said control system is produced by said control unit in accordance with the voltage of said guide capacitor, a discharging circuit connected in parallel with said guide capacitor, the current in said discharging circuit being controllable in accordance with the voltage of said filter and the current of said filter, auxiliary circuit means connected in parallel with said charging circuit, said auxiliary circuit means comprising a switching component having triggering characteristics and another control circuit which are such that said guide capacitor charges more rapidly when said switching component is in its nonconductive condition than via said charging circuit, a reversing switch, the switching condition of said switching component depending upon the switching position of said reversing switch and the signal from said current transformer, said switching component being in its nonconductive condition only during the time which elapses between the energization of said circuit arrangement via said reversing switch and the time during which said current transformer provides a signal for the first time after the energization of said circuit arrangement.

2. A circuit arrangement as claimed in claim 1, wherein said control unit further comprises a thyristor connected in parallel with the control circuit of said switching component, circuit means including the switching path of said reversing switch connected in parallel with said thyristor, said switching path being blocked when said circuit arrangement is deenergized, said thyristor having a control path coupled to said current transformer in a manner whereby said thyristor is switched to its conductive condition at the first signal of said current transformer after the energization of said circuit arrangement.

3. A circuit arrangement as claimed in claim 1, wherein the charging circuit of said control unit includes a transistor and circuit means connecting said transistor as a constant current regulator.